(12) United States Patent
Tamaddon-Dallal et al.

(10) Patent No.: US 9,302,608 B1
(45) Date of Patent: Apr. 5, 2016

(54) CARGO SECURING SYSTEM FOR A PICK UP TRUCK

(71) Applicants: Dorina Tamaddon-Dallal, Foothill Ranch, CA (US); Artin Tamaddon-Dallal, Foothill Ranch, CA (US); Saied Tamaddon-Dallal, Foothill Ranch, CA (US)

(72) Inventors: Dorina Tamaddon-Dallal, Foothill Ranch, CA (US); Artin Tamaddon-Dallal, Foothill Ranch, CA (US); Saied Tamaddon-Dallal, Foothill Ranch, CA (US)

(73) Assignees: Dorina Tamaddon-dallal, Foothill Ranch, CA (US); Artin Tamaddon-dallal, Foothill Ranch, CA (US); Saied Tamaddon-dallal, Foothill Ranch, CA (US)

( * ) Notice: Subject to any disclaimer, the term of this patent is extended or adjusted under 35 U.S.C. 154(b) by 0 days.

(21) Appl. No.: 14/617,474

(22) Filed: Feb. 9, 2015

(51) Int. Cl.
*B60P 7/08* (2006.01)
*B60P 7/135* (2006.01)

(52) U.S. Cl.
CPC ..................................... *B60P 7/135* (2013.01)

(58) Field of Classification Search
CPC ......................................................... B60P 7/135
USPC ............... 410/32, 34, 94, 120, 121, 151, 155; 296/3, 26.09, 26.1; 211/195
See application file for complete search history.

(56) References Cited

U.S. PATENT DOCUMENTS 5,934,850 A * 8/1999 Soumar ................... B60P 7/135
410/122
5,971,685 A * 10/1999 Owens ...................... B60P 7/15
410/122

* cited by examiner

*Primary Examiner* — Stephen Gordon
(74) *Attorney, Agent, or Firm* — Michael Shimokaji

(57) ABSTRACT

A roof-mountable retractable cargo securing system for cargo positioned in an open bed of a pick-up truck, the system may include two roof-mountable base tubes interconnected with a connecting plate so that longitudinal axes of the base tubes are separated by a distance that exceeds a width of the cargo to be secured. Securing members concentric with and slidably engaged with the base tubes may be selectively enclosed within the base tubes or partially extended from the base tubes to positions at sides of the cargo to be secured. Contact arms may be pivotally coupled to ends of the securing members and rotationally positionable to interconnect the securing members with the cargo to be secured.

8 Claims, 3 Drawing Sheets

CARGO SECURING SYSTEM FOR A PICK UP TRUCK

BACKGROUND OF THE INVENTION

The present invention relates to systems that provide securing of cargo being carried in a bed of a pick-up truck and, more particularly, to a cargo securing system that can be engaged with the cargo at a height higher than a side wall of the bed.

A pick-up truck may be used to carry various types of material or cargo. In some cases, it may be desirable to carry tall objects in a standing position. For example, when transporting a residential refrigerator, the refrigerator is typically positioned in a bed of a truck in a standing position. If a refrigerator were to be transported in a prone position, i.e., with its back or front lying on a floor of the bed of the truck, refrigerant might flow away from its normal locations and the refrigerator might suffer damage upon being restarted.

A typical refrigerator is about 6 feet tall and side walls of a typical pick-up truck are less than 2 feet high. Thus, when a refrigerator is placed in a standing position in the bed, more than ⅔ of its height extends above the side walls. Many pick-up trucks are provided with load-securing attachments devices such as welded rings or loops. But these attachment devices are located on the side walls of the bed. Thus, when a refrigerator is secured with straps or ties attached to these conventional devices, only a bottom portion of the refrigerator is secured. In other words, an upper ⅔ of the refrigerator may remain unsecured.

Transporting a standing refrigerator secured in this conventional manner is risky. If the truck were to turn quickly (e.g., to avoid a collision), high lateral acceleration forces would develop. The unsecured upper portion of the refrigerator could be driven laterally by these acceleration forces. In one scenario, the refrigerator might tilt and sustain damage when striking a side wall of the bed. In a worse scenario, the refrigerator might actually fall out of the truck and into a path of oncoming traffic.

As can be seen, there is a need for a cargo-securing system in which cargo may be secured at a height higher than side walls of a bed of the pick-up truck. More particularly, there is a need for such a system that will reduce risk of damage resulting from quick turning of the pick-up truck.

SUMMARY OF THE INVENTION

In one aspect of the present invention, a system for securing cargo on a vehicle comprises: a base tube; a securing member concentric with the base tube and slidably engaged with the base tube to be selectively enclosed within the base tube or partially extended from the base tube; and a pair of cargo contact arms pivotally coupled to an end of the securing member, wherein the cargo contact arms include notched hubs that surround the end of the securing member, and wherein the notched hubs are engageable with each other to lock the contact arms in desired rotational positions so that the contact arms can interconnect the securing member with the cargo to be secured.

In another aspect of the present invention, a roof-mountable retractable cargo securing system for cargo positioned in an open bed of a pick-up truck, the system comprises: two roof-mountable base tubes interconnected with a connecting plate so that longitudinal axes of the base tubes are separated by a distance that exceeds a width of the cargo to be secured; securing members concentric with and slidably engaged with the base tubes for selective enclosure within the base tubes or partial extension from the base tubes to positions at sides of the cargo to be secured; and contact arms pivotally coupled to ends of the securing members and rotationally positionable to interconnect the securing members with the cargo to be secured.

In still another aspect of the present invention, a cargo-securing system for installation on an open-bed pick-up truck having a factory installed roof rack comprises: base tubes; roof-rack clamps coupled to the base tubes; and securing members concentric with and slidably engaged with the base tubes for selective enclosure within the base tubes or partial extension from the base tubes to positions overlying the open bed at a height above the open bed substantially equivalent to a vertical distance between the roof and a floor of the open bed These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a cargo-securing system for a pick-up truck which may be extended from a position over a roof of the truck into a position over the bed when needed and retracted from the bed to overlie a roof of the truck when not in use.

Figure 1:
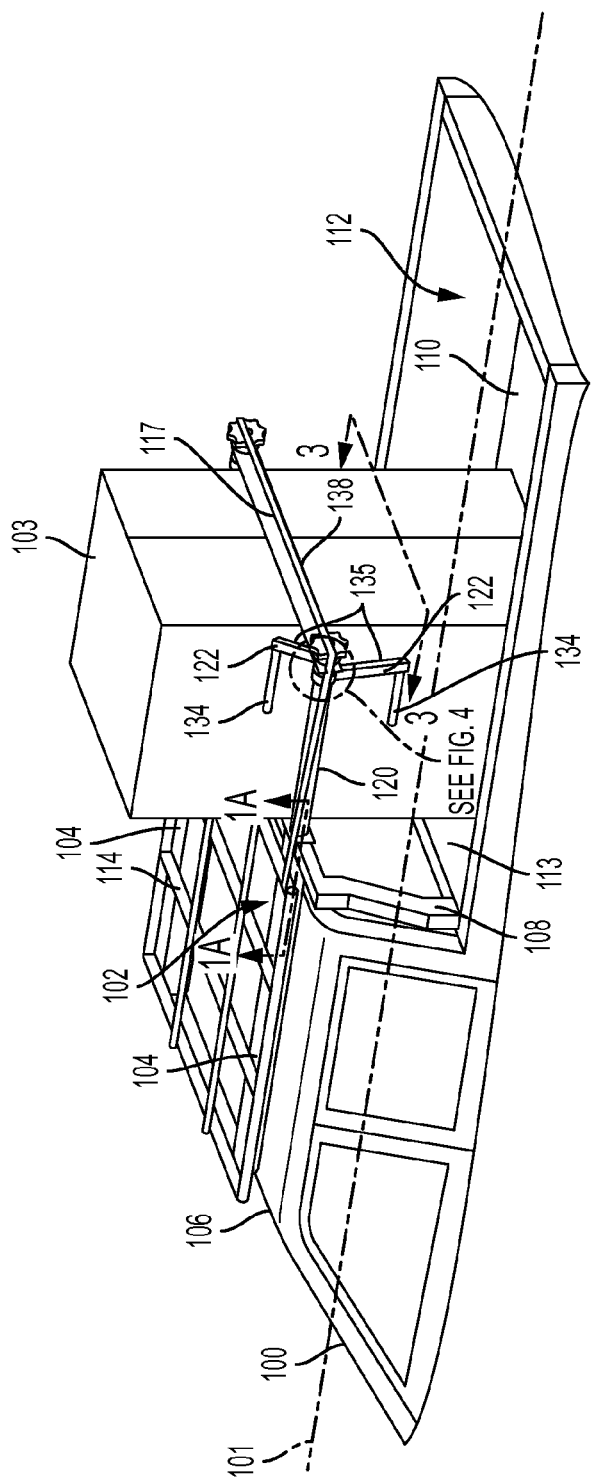
FIG. 1 is a perspective view of a cargo securing system for a vehicle in accordance with an exemplary embodiment of the invention.
Figure 1A:
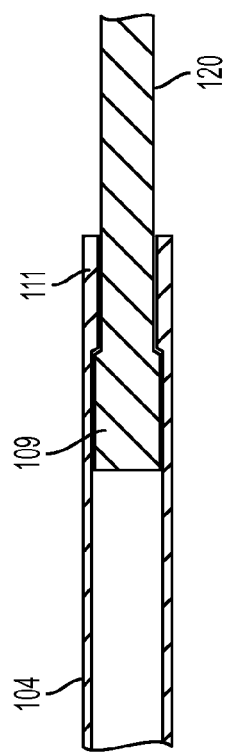
FIG. 1A is a partial sectional view of a portion of the system of FIG. 1 taken along the lines 1A-1A.
Figure 2:
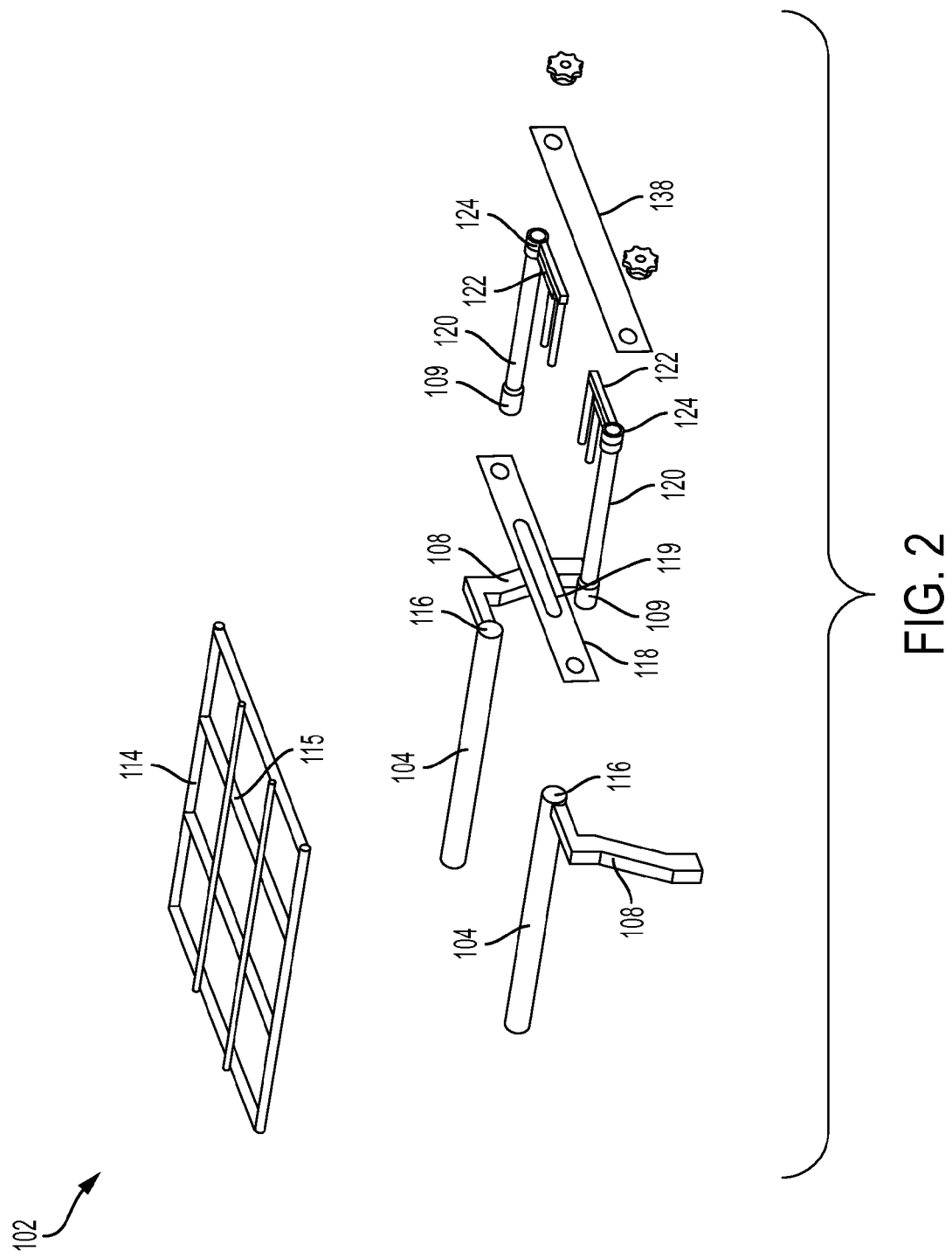
FIG. 2 is an exploded perspective view of elements of the system of FIG. 1 in accordance with an exemplary embodiment of the invention.

Turning now to the description and with reference to FIGS. 1, 1A and 2, an open-bed vehicle such as a pick-up truck 100 may be equipped with an exemplary embodiment of a cargo securing system 102 for cargo 103. Base tubes 104 may be attached to a roof 106 of the truck 100. Support legs 108 may extend from the base tubes to a wall 113 of a bed 112 of the truck 100.

A fixed rack 114 may be attached to the base tubes 104. The fixed rack may be provided with horizontal members 115 oriented substantially orthogonally to a longitudinal axis 101 of the truck 100 and to axes 126 of the base tubes 104 and securing members 120. The horizontal members 115 may be used as attachment points for a tie device 117, such as a strap or bungee cord, which may be employed to secure the cargo against a front wall 113 of the bed 112 of the truck 100.

Rear ends 116 of the base tubes 104 may be connected together with a connecting plate 118. Extendable securing members 120 may be concentric with the base tubes 104 and may be configured to be selectively enclosed stowed inside the base tubes 104 when not in use. The securing members 120 may be selectively extended partially out from the base tubes 104 when the system 102 is deployed to secure the cargo 103. When so deployed, the securing members 120 may be cantilevered over the bed 112 of the truck 100. As shown in FIG. 1A, the securing member 120 may be provided with an external shoulder 111 and the base tube 104 may be provided with an internal shoulder 109. The shoulders 109 and 111 may engage with each other so that the securing members 120 may be precluded from being fully disengaged from the base tubes 104 when the system 102 is deployed to secure the cargo 103. A desired amount of overlapping of the base tube 104 relative to the securing member 120 may be attained by selecting a desired longitudinal placement of the shoulders 109 and 111. In an exemplary embodiment of the system 102, the base tube 104 may overlap the securing member 120 by about 10% to about 15% of the length of the securing member 120.

The base tubes 104 may be laterally spaced from one another by a distance that may be greater than a contemplated width of cargo to be secured. For example, the cargo 103 may be a refrigerator. Typical refrigerators may have various widths between about 23 inches to about 37 inches. In order to accommodate a wide range of refrigerator sizes, the base tubes 104 may be laterally separated by a distance of about 40 to about 45 inches. Thus, when a typical refrigerator is loaded on the truck 100, the extended securing members 120 may be laterally spaced away from sides of the refrigerator.

Figure 3:
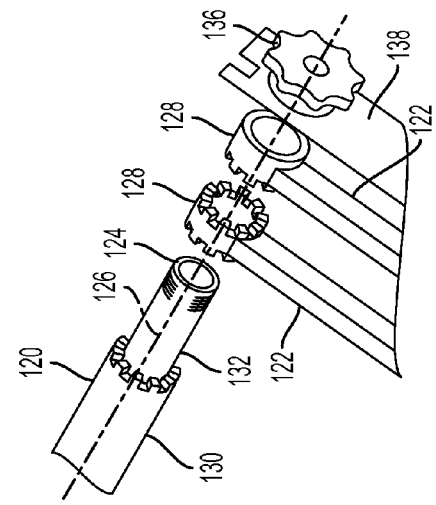
FIG. 3 is a simplified partial elevation view taken along the line 3-3 of FIG. 1 in accordance with an exemplary embodiment of the invention.

Adjustable contact arms 122 may be provided at rear ends 124 of the securing members 120. The contact arms 122 may be pivoted around axes 126 of the securing members 120 so that the contact arms 122 may be rotationally positioned to engage with sides of the cargo 103 as shown in FIGS. 1 and 3. Contact arms 122 may be long enough (about 15 inches each) to adjust to the smallest and largest width of cargo—a refrigerator. The contact arm 122 may include a hub 128, a contact element 134 and a connecting arm 135. The contact elements 134 may be oriented parallel to the axes 126 of the securing members 120. The connecting plate 118 may be provided with a cut-out 119 through which the contact elements 134 may pass when the securing members 120 are stowed within their respective base tubes 104.

Figure 4:
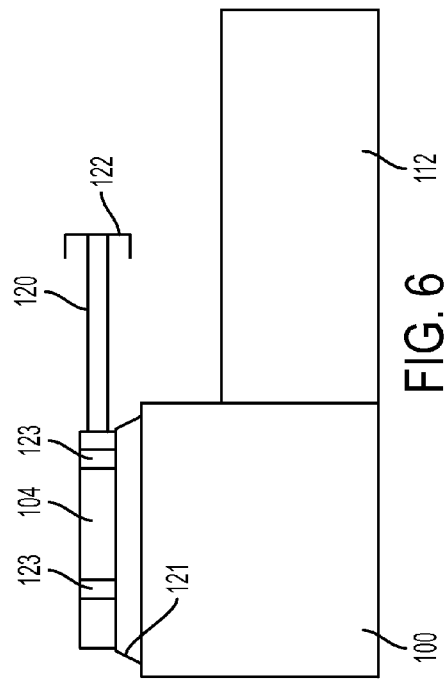
FIG. 4 is a detailed exploded perspective view of a portion of the system of FIG. 1 in accordance with an exemplary embodiment of the invention.

Referring now to FIG. 4, it may be seen that the hubs 128 of the contact arms 122 may be notched. The securing member 120 may be provided with a notched outer tube 130 with a notching pattern that may correspond to that of the hubs 128. An inner tube 132 of the securing member 120 may be threaded at the rear end 124. The contact arms 122 may be pivoted to a desired rotational position so that the contact elements 134 of the contact arms 122 may engage firmly with sides of the cargo 103 as shown in FIG. 3. The hubs 128 may then be engaged with one another and with the outer tube 130. An internally threaded knob 136 may then be tightened onto the threaded end 124 of the inner tube 132 so that the contact arms 122 are locked into their desired rotational positions.

Referring back now to FIG. 2, it may be seen that, in an exemplary embodiment of the system 102, a rear connecting plate 138 may be attached to the rear ends 124 of the securing members 120. The connecting plate 138 may provide desirable lateral supporting integrity to the system 102.

Figure 5:
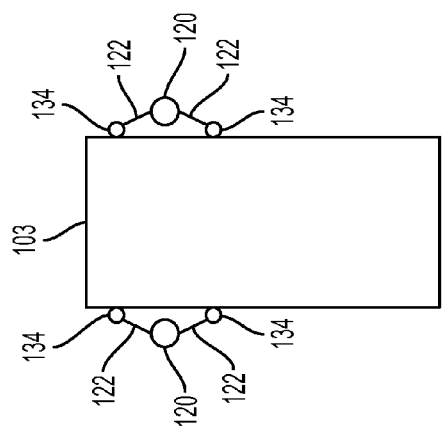
FIG. 5 is a simplified block drawing of a cargo securing system in accordance with another exemplary embodiment of the invention.

Referring now to FIG. 5, it may be seen that, in another exemplary embodiment of a cargo securing system 202, a securing member 220 may be positioned so that its rear end 224 does not reach fully across a side of the cargo 103. The securing member 220 may include a first extension tube 240 and a second extension tube 242. When deployed, the first extension tube 240 may extend only partially out of the base tube 104. Consequently, the first extension tube 240 may be provided with lateral stabilization from an overlapping relationship with the base tube 104. Similarly, the second extension tube 242 may remain overlapped with the first extension tube 240 when the securing system 202 is deployed. Desirable lateral stability may be provided when a length L1 of overlapping of one of the extension members is at least 30% to about 50% of a length L2 of a surrounding extension member or base tube. As discussed above with respect to FIG. 1A, this desired amount of overlapping may be provided through selective relative positioning of the shoulders 109 and 111.

The cargo securing system 202 may be advantageously utilized on pick-up trucks having a short roof length, e.g., a so-called regular cab truck. In that case the multiple extension tubes may be retracted or telescoped together so that they may collectively fit within a relatively short base tube that may not extend beyond front and rear edges of a roof of the truck. Similarly, the cargo securing system 102 of FIGS. 1 and 3 may be adapted for use on short roof trucks. The securing members 120 of the system 102 may be constructed with telescoping extension tubes (not shown).

Figure 6:
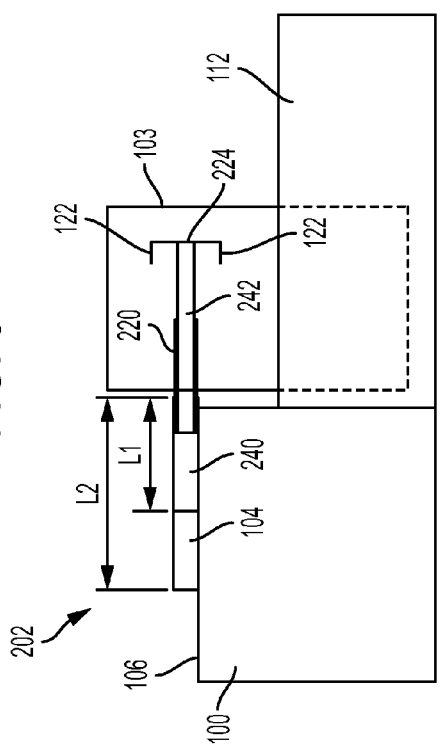
FIG. 6 is a simplified block drawing of a cargo securing system in accordance with still another exemplary embodiment of the invention

In an alternative embodiment of the system 102 illustrated in FIG. 6, the base tubes 104 may be temporarily clamped to longitudinal members 121 of a factory installed roof rack if the pick-up truck 100 is so equipped. The base tubes 104 may be provided with a roof-rack clamp 123 adapted to engage the longitudinal members 121. Typically, a factory-installed roof rack includes horizontal cross members which may be used as attachment points for the tie device 117. Consequently there may not be a need to install one of the fixed racks 114 (shown in FIG. 2).

It should be understood, of course, that the foregoing relates to exemplary embodiments of the invention and that modifications may be made without departing from the spirit and scope of the invention as set forth in the following claims.

We claim:

1. A system for securing cargo on a vehicle, the system comprising:
   a base tube:
   a securing member concentric with the base tube and slidably engaged with the base tube to be selectively enclosed within the base tube or partially extended from the base tube; and
   a pair of cargo contact arms pivotally coupled to an end of the securing member;
   wherein the cargo contact arms include notched hubs that surround the end of the securing member; and
   wherein the notched hubs are engageable with each other to lock the contact arms in desired rotational positions so that the contact arms can interconnect the securing member with the cargo to be secured.

2. The system of claim 1 further comprising:
   a second base tube;
   a second securing member concentric with the second base tube and slidably engaged with the second base tube to be selectively enclosed within the second base tube or partially extended from the second base tube; and a second pair of cargo contact arms pivotally coupled to the second securing member;

wherein the second pair of cargo contact arms include notched hubs that surround an end of the second securing member.

3. The system of claim 2 further comprising a connecting plate coupled between the base tube and the second base tube.

4. The system of claim 2 further comprising a fixed rack coupled to the base tube and the second base tube, wherein the fixed rack includes a horizontal member oriented substantially orthogonally to longitudinal axes of the securing member and the second securing member.

5. The system of claim 1:

wherein the securing member includes a first extension tube slidably engaged with a second extension tube;

wherein the first extension tube has an outside diameter smaller than an inside diameter of the base tube;

wherein the first extension tube has an inside diameter greater than an outside diameter of the second extension tube;

wherein the first extension tube has a length no greater than a length of the base tube; and wherein the second extension tube has a length no greater than the length of the base tube so that the first and second extension tubes are retractable for enclosure within the base tube.

6. The system of claim 5:

wherein the base tube includes an internal shoulder;

wherein the first extension tube includes an external shoulder having an outer diameter greater than an inside diameter of the internal shoulder of the base tube; and wherein, upon engagement between the internal shoulder and the external shoulder, the base tube overlaps the first extension tube by about 30% to about 50% of the length of the first extension tube.

7. The system of claim 1:

wherein the base tube includes an internal shoulder;

wherein the securing member includes an external shoulder having an outer diameter greater than an inside diameter of the internal shoulder of the base tube; and wherein, upon engagement between the internal shoulder and the external shoulder, the base tube overlaps the securing member by about 10% to about 15% of the length of the securing member.

8. The system of claim 1 wherein each contact arm includes:

a contact element oriented parallel to an axis of the securing member, and a connecting arm interconnecting the contact element and the respective hub.

\* \* \* \* \*